R. M. MERRIMAN.
FOUR PLY LOCK CORD TIRE.
APPLICATION FILED DEC. 30, 1916.
1,221,888.
Patented Apr. 10, 1917.
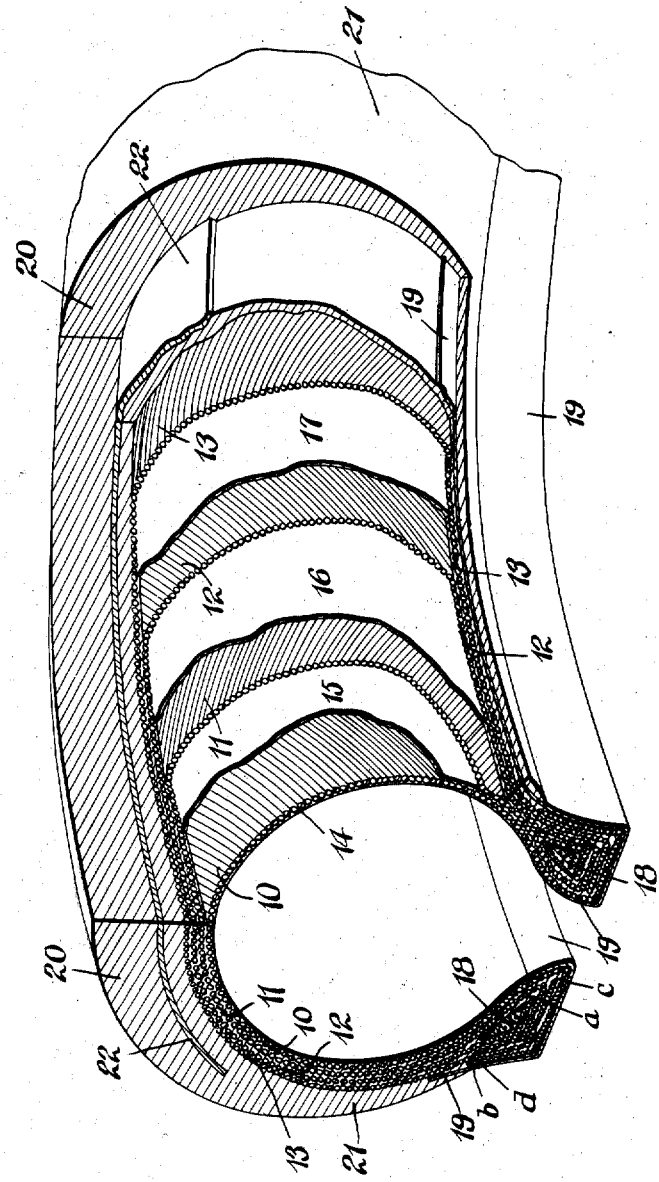
Inventor
R. M. Merriman.
By [signature], Attorneys

UNITED STATES PATENT OFFICE.

ROBERT M. MERRIMAN, OF AKRON, OHIO.

FOUR-PLY LOCK-CORD TIRE.

1,221,888.

Specification of Letters Patent.   Patented Apr. 10, 1917.

Application filed December 30, 1916.   Serial No. 139,886.

*To all whom it may concern:*

Be it known that I, ROBERT M. MERRIMAN, a citizen of the United States, residing at Akron, in the county of Summit and State of Ohio, have invented certain new and useful Improvements in Four-Ply Lock-Cord Tires, of which the following is a specification.

My invention relates to new and useful improvements in pneumatic tires or casings and more particularly cord tires, the primary object of my invention being the provision of an improved and superior form of four-ply lock cord tire.

In cord tires as now constructed, two plies of relatively large and commonly tubular cord are employed and, as a result, in order to bring the portions of the cord at the tread of the tire in juxtaposition to each other, the cord must, of necessity, be flattened and given a part turn as it is wound about the core during the construction of the tire as otherwise when the strands of cord engaged each other adjacent the bead or side portions of the tire they would be spaced a considerable distance at the tread or portion of the tire having the greatest circumference.

One of the primary objects of this invention resides in the employment of a greater number of plies of relatively small cord which, because of its small diameter, may have its strands sufficiently pressed together at the bead and side portions of the tire to permit them to engage at the tread portion of the tire without any flattening or twisting of the cord.

Another object which I have in view and which I accomplish by the employment of the relatively small cord and the increased number of plies, is the prevention of likelihood of blow outs, due to any defect in any part of the cord as the small size of the cord and consequent small space which a portion of any one strand occupies in the tire, as well as the number of superimposed plies of cord, so localizes any weakness, due to defect in the cord, as to practically in no way diminish the strength of the tire as a whole.

Another object which I have in view is the provision of a tire construction in which cord tires of the straight side bead type may be readily constructed and in which the beads will be firmly anchored by the several plies of cord which are passed about the beads in such a manner as to not only anchor the beads but to anchor each other at the beads.

With these and other objects in view, my invention will be more fully described, illustrated in the accompanying drawing, and then specifically pointed out in the claims which are attached to and form a part of this application.

The drawing is a fragmentary perspective view, partially in section, of a cord tire constructed in accordance with my present invention.

Corresponding and like parts are referred to in the following description and indicated in the drawing by the same reference characters.

As clearly shown in the drawing, my improved cord tire includes superimposed plies of cord 10, 11, 12 and 13 in which the inner face of the inner cord ply has a protective coating 14 provided by cementing the core coating or former upon which the tire is shaped. Each of these cord plies is formed from relatively small cord wound under suitable tension about the former or core. The method of constructing this tire is clearly disclosed in a copending application filed by me December 30, 1916, and bearing the Serial No. 139,885 so that any detailed description of the method of manufacture is unnecessary in this case. It should, however, be noted that the relatively small cords making up the plies are compressed against each other in the side wall and bead portions of the tire in such a manner that adjacent strands of cord will engage each other at the tread portion of the tire. Furthermore, in each ply the cord is wound diagonally about the core at substantially an angle of 45° to the radial, each successive ply being wound in a reverse direction to the adjacent ply, as clearly shown in the drawing. Interposed between the adjacent plies of cord are thin plies 15, 16 and 17 of rubber or other suitable frictioning compound which, during the curing of the tire, is pressed into and between the cords to firmly bind the cords of each tire together and to the cords of adjacent plies.

In the present case, I have illustrated a tire of the straight side bead type as this form of cord tire construction is particularly adapted for use in the manufacture of such tires. The beads are indicated at 18 and may be of the usual or any preferred type. One of the chief features of this invention resides in the manner in which the beads are anchored or locked by the various cord plies making up the tire and this bead structure will now be explained. In the constructing of the tire, the cord plies 10 and 11 are applied to the core and the beads are then positioned against the outer face of the cord ply 11 when the third cord ply 12 is wound about the core and over the beads. The ply 12, when so wound, is severed in such a manner that it may be shaped in against the outer faces of the beads and its free ends may be brought in against the bases of the beads, as shown at A, to terminate substantially in line with the inner edges of the beads. The second ply 11 is then severed and brought outwardly against the portion A of the ply 12 and upwardly along the outside of the beads, as shown at B to approximately the level of the upper edges of the beads. The fourth ply 13 is then wound about the core and severed in the same manner as the ply 12 and is shaped in against the outer faces of the beads and brought in beneath the bases of the beads, as shown at C, in the same manner as the portions A of the plies 12. The inner ply 10 is then severed and brought outwardly across the bases of the beads and upwardly along the sides thereof, as indicated at D. As will be apparent, this construction provides two cord plies along the inner face of each bead and four cord plies across the base portions and up the side portions of the beads, with the result that the beads are firmly inclosed in the end portions of the plies and the built up bead as a whole is properly shaped. Furthermore, the free ends of the cord strands of adjacent plies overlap each other about the beads so that one ply serves to anchor the ends of the next and the inner ply of the tire constitutes the outer ply at the base and side portions of the beads. After the beads have been thus formed and properly trimmed, chafing strips 19 of fabric are cemented in place, the inner edges of these strips being disposed substantially on the level with the base portions of the beads proper 18 and the outer edges of the strips being extended upwardly a considerable distance above the beads, as clearly shown. Tread and side wall portions 20 and 21 are then applied, the outer edges of the chafing strips extending into the side wall portions and a breaker strip 22 being preferably embedded in the tread portion 20.

The size of the cord employed in the construction of the ply may be varied slightly for different sized tires in order to insure proper engagement of the cord strands at the tread portion of the finished tire. Obviously, although four plies of cord are considered sufficient, additional plies may be added and a tire of six, eight, ten or twelve plies may be constructed. In any event, the same bead construction will be followed and it will always be the inner ply which will form the outer covering of the bases and outer side walls of the beads. The above described tire is fully as flexible as the ordinary two ply cord tire, will keep its shape as well, is less subject to blow outs, due to possible defects in cord employed, and is more economical in manufacture as no peculiarly woven or prepared cord is required and no complicated machines for twisting the cord as it is wound are necessary. Furthermore, the cord employed may be stronger, tougher and more closely woven than that commonly employed as, due to its smaller size, it will be thoroughly impregnated with the gum rubber employed as frictioning, even though very closely woven.

Having thus described the invention, what is claimed as new is:

1. In a four-ply cord tire, four superimposed cord plies, and beads interposed between the two inner and two outer plies at each side, the free ends of the third ply from the inside of the tire being passed across the outer faces and bases of the beads, the free ends of the second ply from the inside being passed outwardly across the bases of the beads and upwardly along the outer sides thereof, the free ends of the outer ply being passed downwardly over the side faces and inwardly across the bases of the beads and the free ends of the inner ply being passed outwardly across the bases of the beads and upwardly along the side faces thereof.

2. In a four-ply cord tire, four superimposed cord plies, and beads interposed between the two inner and two outer plies at each side, the free ends of the third ply from the inside of the tire being passed across the outer faces and bases of the beads, the free ends of the second ply from the inside being passed outwardly across the bases of the beads and upwardly along the outer sides thereof, the free ends of the outer ply being passed downwardly over the side faces and inwardly across the bases of the beads and the free ends of the inner ply being passed outwardly across the bases of the beads and upwardly along the side faces thereof, and chafing strips having their inner edges secured to the inner faces of the bead portions of the tire in substantially the level of the bases of the beads proper and having their outer edges extending into the side walls of the tire to points above the upper edges of the beads proper.

3. In a multiple ply cord tire, a plurality of superimposed plies of cord, and beads interposed between certain of the plies at either side of the tire, the free ends of the plies at either side of each bead being alternately passed inwardly across the base of the bead and outwardly across the base of the bead and up the outer sides thereof, the innermost ply at each side being the last to be passed about the bead.

4. In a multiple ply cord tire, a plurality of superimposed plies of cord, and beads interposed between certain of the plies at either side of the tire, the free ends of the plies at either side of each head being alternately passed inwardly across the base of the bead and outwardly across the base of the bead and up the outer sides thereof, the free ends of the plies extending inwardly across the base of the beads, terminating immediately below the inner edges of the beads and those passed upwardly along the outer sides of the beads, terminating adjacent the upper edges of the beads.

In testimony whereof I affix my signature.

ROBERT M. MERRIMAN. [L. S.]

It is hereby certified that in Letters Patent No. 1,221,888, granted April 10, 1917, upon the application of Robert M. Merriman, of Akron, Ohio, for an improvement in "Four-Ply Lock-Cord Tires," an error appears in the printed specification requiring correction as follows: Page 3, line 10, claim 4, for the word "head" read *bead;* and that the said Letters Patent should be read with this correction therein that the same may conform to the record of the case in the Patent Office.

Signed and sealed this 26th day of June, A. D., 1917.

[SEAL.]

R. F. WHITEHEAD,

*Acting Commissioner of Patents.*

Cl. 152—13.